April 27, 1948.                R. D. HICKOK                2,440,607
                          ELECTRONIC TUBE TESTER
                           Filed Feb. 5, 1946

INVENTOR
ROBERT D. HICKOK
BY
*Hyde, Meyer, Baldwin & Doran*
ATTORNEYS

Patented Apr. 27, 1948

2,440,607

UNITED STATES PATENT OFFICE 2,440,607

ELECTRONIC TUBE TESTER

Robert D. Hickok, Bratenahl, Ohio, assignor to Cleveland Patents, Incorporated, a corporation of Ohio Application February 5, 1946, Serial No. 645,658

6 Claims. (Cl. 315—370)

This invention relates to apparatus for the testing of vacuum tubes, and more particularly for the measurement and indication of mutual conductance thereof. The invention is an improvement upon the testing apparatus shown, described, and claimed in a prior patent, No. 1,999,858, granted April 30, 1935, to Job R. Barnhart, for Tube tester, to which reference may be had if desirable or necessary.

In said patent, it is necessary to introduce, into the two windings or plate current coils of the transformer secondary which supply voltage for application to the tube under test, two resistances which in one form of practical tester designed for and used in actual service are of the order of 150 ohms each. These resistances, in Fig. 1 of said Barnhart patent, are marked $r_1$, $r_2$, respectively. These resistances reduce the actual effective voltage applied to the tube under test, and with it the mutual conductance reading.

Such condition becomes objectionable with certain tubes, such as No. 45, where the plate current is high—on the order of 30 milliamperes—and the mutual conductance is also high—on the order of 3,000 micromhos.

When testing tubes having low plate current and low mutual conductance, the presence of these resistances has no serious consequence, but the different effects encountered in testing a wide range of different tube types present a vexing and perplexing problem from the standpoint of calibration of the instrument.

The present invention has for its object to provide an improved testing apparatus of the character described, which eliminates the said resistances and thus increases the plate current which is applied to the tube under test, with the consequence of increasing the mutual conductance reading, enabling the instrument to be more easily calibrated and adapting it for accurate measurement of mutual conductance over a wider range of different tube types.

Still another object is to provide an improved tube tester of this kind in which the resistances before mentioned have been replaced by a third coil acting in conjunction with the two plate current secondary coils which supply voltage for application to the tube under test, thus enabling an actual and accurate reading of mutual conductance to be obtained, without external added resistance, by the use of a low reading voltmeter or an ordinary low resistance milliammeter in series with said third winding.

Further objects of the invention in part are obvious and in part will appear more in detail hereinafter.

Figure 1:
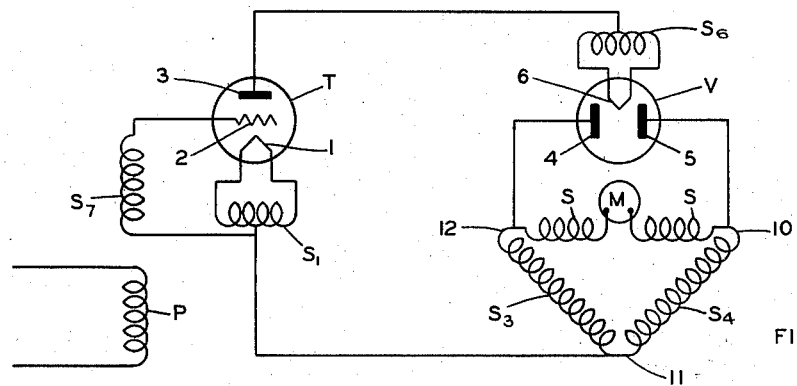
Fig. 1 represents, in diagram form, one arrangement of apparatus embodying the invention.

In a large measure, apparatus embodying my improvement is similar to that shown, described and claimed in the aforesaid Barnhart patent, to which reference may be had for a more complete description of the arrangement, purposes and manner of operation of various parts without extended discussion here. It is sufficient to say that in all views of the drawings, the tube under test is indicated at T, and the rectifying tube for applying plate voltage to it at V. Tube T may be any of the usual forms of vacuum tube containing several elements and is illustrated as a three-element tube containing the usual filament 1, grid 2, and plate 3. The rectifying tube V includes plates 4, 5 and a filament 6. Filaments 1, 6 are energized, respectively, by secondaries $S_1$, $S_6$, associated with the primary P, as are all other secondaries, herein referred to, unless otherwise stated. Plates 4, 5 of the rectifying tube are energized by secondaries $S_3$, $S_4$.

The third winding before referred to, which has been substituted for the two resistances $r_1$, $r_2$, of the Barnhart patent, is designated SS in all views. It is a winding of relatively low resistance, and is shown in series with the measuring and indicating instrument M, and specifically in series with said meter, with one half of the winding on each side of the meter. Meter M may be either a low reading voltmeter or an ordinary low resistance milliammeter, calibrated, however, in micromhos, to indicate mutual conductance.

Before proceeding to a description of the circuits shown, and their manner of operation, it may be well first to consider mutual conductance from a broad standpoint. The mutual conductance of a vacuum tube is the relation which exists, when the tube is in operation, between the change in its plate current consequent upon a change in its grid voltage. The effect is due to the action of A. C. voltage applied to the grid of the tube under test changing its A. C. resistance with each cycle. In a diagram of the rectified output of a tube under test, the effect of an A. C. voltage applied to its grid is to alternately elevate and depress alternate lobes of the rectified sine wave, the amplitude of the difference in height between the two sets of lobes being a measure of the mutual conductance.

Now, referring to Fig. 1, the action of this circuit is as follows:

Let us assume that windings $S_3$, $S_4$ each produce a voltage of 200 volts, and that winding $S_4$ is so connected that point 10 is positive at the crest of one half cycle of the alternations. Then current will flow from the point 10 to plate 5, to filament 6, to plate 3 of tube T, to filament 1, to winding $S_1$ to point 11 of winding $S_4$.

At the same time a portion of the current flowing in the same circuit will be supplied by the winding SS, which in this instance is designed to develop, say, 400 volts, 200 of which will counteract the effect of winding $S_3$.

Accordingly the current developed by winding $S_4$ and SS may be determined from a formula, as follows:

*Formula 1*

$$I = \frac{200}{\left(\frac{(RSS+RS_3)RS_4}{RSS+RS_3+RS_4}\right)+RV+RT}$$

in which:

RSS = resistance of SS
$RS_3$ = resistance of $S_3$
$RS_4$ = resistance of $S_4$
RV = resistance of V
RT = resistance of T The current in winding SS now may be determined from a further formula, as follows:

*Formula 2*

$$ISS = \frac{RS_4}{RSS+RS_3+RS_4}$$

Current flowing in the manner described, at the instant referred to, would tend to cause meter M to indicate by motion of its pointer from zero in the clockwise direction.

Winding $S_3$ is so connected that point 12 is positive at the crest of the next half cycle. Thereupon winding $S_3$ passes current to the tube to be tested by flow from point 12 to plate 4, to filament 6, winding $S_6$, plate 3 of tube T, filament 1, winding $S_1$ and back to point 11. The effect on the moving system of meter M is exactly the same, and of the same value, as before, but in the opposite direction.

Hence stable A. C. current applied to tube T, without variation of its grid voltage, has no effect upon meter M, whose pointer remains stationary.

However, if a signal voltage is applied to the grid of tube T, such as by means of secondary $S_7$, the currents developed by windings $S_3$, $S_4$, at the crests of successive waves, no longer are equal. One wave is elevated, and the next depressed, and so on. Meter M responds by motion of its pointer in one direction or the other to an extent dependent upon the amplitude of the difference in height of the two sets of waves, and may be calibrated to indicate mutual conductance directly, in micromhos.

Figure 2:
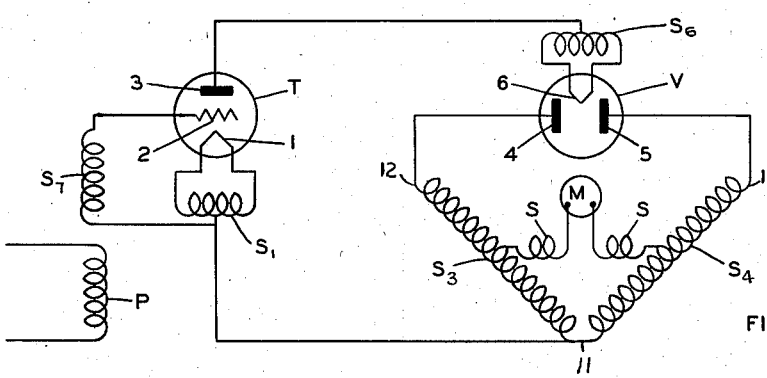
Fig. 2 is a similar diagram, illustrating another form.

The same result may be obtained by connecting the third winding to points located intermediate the ends of windings $S_3$, $S_4$, but symmetrically with respect to each other, as shown in Fig. 2, provided the winding SS is designed to develop the same voltage as the combined windings $S_3$, $S_4$, develop at the points of their connection to winding SS.

Figure 3:
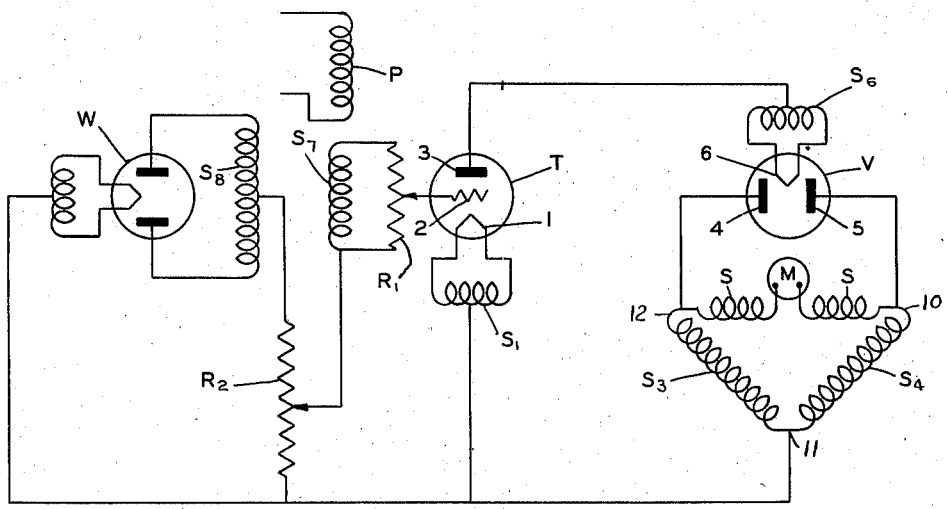
Fig. 3 is another diagram illustrating another arrangement for applying variable effects to the grid of the tube under test.

Variations in the grid voltage of tube T, such as are useful in the measurement of its mutual conductance, of course may be produced in many different ways. Any of the circuits described for the purpose in the said Barnhart patent may be employed. In Fig. 3, I show an arrangement in which a variable signal effect may be applied in addition to variation in negative grid bias. The signal effect is applied from primary P by secondary $S_7$ and is transmitted to the grid by adjustable resistance $R_1$. The grid bias, here D. C., comes from rectifying tube W the plates of which are energized by secondary winding $S_8$, the bias being applied to the grid 2 by way of adjustable resistance $R_2$.

In the calibration of meter M, to indicate mutual conductance directly, in micromhos, calculations proceed from the fact that the mutual conductance of a three or more element tube, of the types capable of measurement by the apparatus of this invention, can be determined as follows:

*Formula 3*

$$Gm = \frac{Ip}{Eg}$$

in which:

$Gm$ = mutual conductance
$Ip$ = the change in plate current
$Eg$ = the change in grid voltage.

When the tube under test is in operation, with an applied signal voltage, the plate current falls during one set of alterations and rises during the other set, and the current prevailing during each of the two sets may be calculated from equations, as follows:

*Formula 4*

For alternation A:

$$\text{Current in } S_4 \text{ and } SS = \frac{200}{\left(\frac{(RSS+RS_3)RS_4}{RSS+RS_3+RS_4}\right)+RV+RT}$$

For alternation B:

$$\text{Current in } S_3 \text{ and } SS = \frac{200}{\left(\frac{(RSS+RS_4)RS_3}{RSS+RS_3+RS_4}\right)+RV+RT}$$

The difference in the above two values of current flow now may be used to solve Formula 3, with a resulting value expressed in micromhos which can be calibrated upon the dial of meter M, thus giving a direct reading of mutual conductance. But, as before stated, the elimination of the relatively high resistance of the resistances formerly employed, as in the Barnhart patent, has increased pointer movement and sensitivity and enables the testing device to be applied for use in the testing of a wider range of tubes than heretofore.

It should be noted that the exact value of resistance of the third winding SS is not material, except from the standpoint that the lower the resistance of this winding, the greater will be the value of the current flowing through the winding and the meter with which it is associated. Usually the winding SS has a resistance considerably lower than the resistances $r_1$, $r_2$ of the Barnhart patent, which must be of the order of 150 ohms each. Thus the winding SS in the present circuit aids in supplying power to the tube under test, whereas in Barnhart the said resistances constitute an additional load of resistance in the circuit.

What I claim is:

1. Apparatus for the measurement of mutual conductance comprising a full wave rectifying tube having two plate electrodes, an alternating current input circuit for said rectifying tube including a first coil connected at one end to one said electrode, a second coil connected at one end to the other said electrode, the two other ends of the coils being connected to each other at a common point, a third coil in a bridge circuit cross-connecting symmetrically corresponding points on said first and second coils whereby to produce a bridging shunt, meter means in said bridge circuit for measuring current flow therethrough, means for inducing an alternating current potential in each of said first, second, and third coils, a tube to be tested having a plate, a grid, and an electron emission element, the said electron emission element being connected to the aforesaid common point, the D. C. output from said rectifying tube being applied to said plate, and means for applying a variable control potential to said grid, whereby to produce a proportional variation in the plate current of the tube to be tested and a consequent indication upon said meter of the mutual conductance of the tube to be tested.

2. Apparatus for the measurement of mutual conductance comprising a full wave rectifying tube having two plate electrodes, an alternating current input circuit for said rectifying tube including a first coil connected at one end to one said electrode, a second coil connected at one end to the other said electrode, the two other ends of the coils being connected to each other at a common point, a third coil in a bridge circuit cross-connecting the ends of said first and second coils connected to said electrodes whereby to produce a bridging shunt, meter means in said bridge circuit for measuring current flow therethrough, means for inducing an alternating current potential in each of said first, second, and third coils, a tube to be tested having a plate, a grid and an electron emission element, the said electron emission element being connected to the aforesaid common point, the D. C. output from said rectifying tube being applied to said plate, and means for applying a variable control potential to said grid whereby to produce a proportional variation in the plate current of the tube to be tested, and a consequent indication upon said meter of the mutual conductance of the tube to be tested.

3. Apparatus for the measurement of mutual conductance comprising a full wave rectifying tube having two plate electrodes, an alternating current input circuit for said rectifying tube including a first coil connected at one end to one said electrode, a second coil connected at one end to the other said electrode, the two other ends of the coils being connected to each other at a common point, a third coil in a bridge circuit cross-connecting symmetrically corresponding points on said first and second coils whereby to produce a bridging shunt, meter means in said bridge circuit for measuring current flow therethrough, means for inducing an alternating current potential in each of said first, second, and third coils, a tube to be tested having a plate, a grid and an electron emission element, the said electron emission element being connected to the aforesaid common point, the D. C. output from said rectifying tube being applied to said plate, and means for applying an alternating current potential to said grid whereby to produce a proportional variation in the plate current of the tube to be tested, and a consequent indication upon said meter of the mutual conductance of the tube to be tested.

4. Apparatus for the measurement of mutual conductance comprising a full wave rectifying tube having two plate electrodes, an alternating current input circuit for said rectifying tube including a first coil connected at one end to one said electrode, a second coil connected at one end to the other said electrode, the two other ends of the coils being connected to each other at a common point, a third coil in a bridge circuit cross-connecting symmetrically corresponding points on said first and second coils whereby to produce a bridging shunt, meter means in said bridge circuit for measuring current flow therethrough, means for inducing an alternating current potential in each of said first, second, and third coils, the potential applied to said third coil being equal to the sum of the potentials in the connected and bridged portions of the said first and second coils, a tube to be tested having a plate, a grid and an electron emission element, the said electron emission element being connected to the aforesaid common point, the D. C. output from said rectifying tube being applied to said plate, and means for applying an alternating current potential to said grid whereby to produce a proportional variation in the plate current of the tube to be tested, and a consequent indication upon said meter of the mutual conductance of the tube to be tested.

5. Apparatus for the measurement of mutual conductance comprising a full wave rectifying tube having two plate electrodes, an alternating current input circuit for said rectifying tube including a first coil connected at one end to one said electrode, a second coil connected at one end to the other said electrode, the ends of the coils thus connected to the respective electrodes being disposed to have opposed phase relationships at the same instant in the alternating cycle, the two other ends of the coils being connected to each other at a common point, a third coil in a bridge circuit cross-connecting symmetrically corresponding points on said first and second coils whereby to produce a bridging shunt, meter means at the mid point of said bridge circuit for measuring current flow therethrough, means for inducing an alternating current potential in each of said first, second, and third coils, a tube to be tested having a plate, a grid and an electron emission element, the said electron emission element being connected to the aforesaid common point, the D. C. output from said rectifying tube being applied to said plate, and means for applying an alternating control potential to said grid whereby to produce a proportional variation in the plate current of the tube to be tested, and a consequent indication upon said meter of the mutual conductance of the tube to be tested.

6. Apparatus for the measurement of mutual conductance comprising a full wave rectifying tube having two plate electrodes, an alternating current input circuit for said rectifying tube including a first coil connected at one end to one said electrode, a second coil connected at one end to the other said electrode, the two other ends of the coils being connected to each other at a common point, a third coil in a bridge circuit cross-connecting corresponding points on said first and second coils whereby to produce a bridging shunt, meter means in said bridge circuit for measuring current flow therethrough, means for inducing an alternating current potential in each of said first, second, and third coils, a tube to be tested having a plate, a grid and an electron emission element, the said electron emission element being connected to the aforesaid common point, the D. C. output from said rectifying tube being applied to said plate, means for applying an alternating current control potential to said grid, and further means for applying to said grid a variable direct current whereby to produce a proportional variation in the plate current of the tube to be tested, and a consequent indication upon said meter of the mutual conductance of the tube to be tested.

ROBERT D. HICKOK.

REFERENCES CITED

The following references are of record in the file of this patent:

UNITED STATES PATENTS

| Number | Name | Date |
| --- | --- | --- |
| 1,999,858 | Barnhart | Apr. 30, 1935 |